United States Patent
Dropps

(10) Patent No.: US 7,519,058 B2
(45) Date of Patent: Apr. 14, 2009

(54) ADDRESS TRANSLATION IN FIBRE CHANNEL SWITCHES

(75) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 750 days.

(21) Appl. No.: 11/037,922

(22) Filed: Jan. 18, 2005

(65) Prior Publication Data

US 2006/0159081 A1   Jul. 20, 2006

(51) Int. Cl.
*H04L 12/56* (2006.01)
*H04J 1/16* (2006.01)

(52) U.S. Cl. .................................... 370/389; 370/419

(58) Field of Classification Search ......... 370/352–356, 370/400, 401, 419, 389
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schlichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/2.2 |
| 4,821,034 A | 4/1989 | Anderson et al. | 340/2.22 |
| 4,860,193 A | 8/1989 | Bentley et al. | |
| 4,980,857 A | 12/1990 | Walter et al. | |
| 5,025,370 A | 6/1991 | Koegel et al. | |
| 5,051,742 A | 9/1991 | Hullett et al. | |

(Continued)

FOREIGN PATENT DOCUMENTS

EP           0649098           4/1995

(Continued)

OTHER PUBLICATIONS

Banks, David C., et al., "Link Trunking and Measuring Link Latency in Fibre Channel Fabric", U.S. Appl. No. 60/286,046, 1-52.

(Continued)

*Primary Examiner*—John Pezzlo
(74) *Attorney, Agent, or Firm*—Klein, O'Neill & Singh, LLP

(57) ABSTRACT

A fibre channel switch element and method for processing frames in a fibre channel network is provided. The switch element includes an address mapping cache that receives an incoming fibre channel frame in a receive and/or transmit segment, wherein the address mapping cache compares a D_ID of an incoming frame in the receive segment and/or a S_ID in the transmit segment; and if a FR_Header is received then a D_ID or S_ID is compared from a fibre channel header that follows the FR_Header; and if a compare fabric identifier flag is set, then the fabric identifier is compared. The address mapping cache may also be used for routing frames from one virtual fabric to another by comparing a VF_ID field to a Virtual fabric identifier in a VFT_Header.

18 Claims, 11 Drawing Sheets

U.S. PATENT DOCUMENTS

| | | | |
|---|---|---|---|
| 5,090,011 A | 2/1992 | Fukuta et al. | |
| 5,115,430 A | 5/1992 | Hahne et al. | |
| 5,144,622 A | 9/1992 | Takiyasu et al. | 370/401 |
| 5,258,751 A | 11/1993 | DeLuca et al. | |
| 5,260,933 A | 11/1993 | Rouse | |
| 5,260,935 A | 11/1993 | Turner | |
| 5,339,311 A | 8/1994 | Turner | |
| 5,367,520 A | 11/1994 | Cordell | 370/395.71 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,590,125 A | 12/1996 | Acampora et al. | |
| 5,594,672 A | 1/1997 | Hicks | |
| 5,598,541 A | 1/1997 | Malladi | 395/106 |
| 5,610,745 A | 3/1997 | Bennett | 398/52 |
| 5,623,492 A | 4/1997 | Teraslinna | |
| 5,666,483 A | 9/1997 | McClary | |
| 5,677,909 A | 10/1997 | Heide | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,463,032 B1 | 10/2002 | Lau et al. | |
| 6,467,008 B1 | 10/2002 | Gentry et al. | |
| 6,470,026 B1 | 10/2002 | Pearson et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,629,161 B2 | 9/2003 | Matsuki et al. | |
| 6,643,298 B1 | 11/2003 | Brunheroto et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,886,141 B1 | 4/2005 | Kunz et al. | 716/1 |
| 6,888,831 B1 | 5/2005 | Hospodor et al. | |
| 6,901,072 B1 | 5/2005 | Wong | |
| 6,904,507 B2 | 6/2005 | Gil | |
| 6,922,408 B2 | 7/2005 | Bloch et al. | |
| 6,928,470 B1 | 8/2005 | Hamlin | |
| 6,934,799 B2 | 8/2005 | Acharya et al. | |
| 6,941,357 B2 | 9/2005 | Nguyen et al. | |
| 6,941,482 B2 | 9/2005 | Strong | |

| Patent/Publication | Date | Name | |
|---|---|---|---|
| 6,947,393 B2 | 9/2005 | Hooper, III | |
| 6,952,659 B2 | 10/2005 | King et al. | |
| 6,968,463 B2 | 11/2005 | Pherson et al. | |
| 6,975,627 B1 | 12/2005 | Parry et al. | |
| 6,987,768 B1 | 1/2006 | Kojima et al. | |
| 6,988,130 B2 | 1/2006 | Blumenau et al. | |
| 6,988,149 B2 | 1/2006 | Odenwald | |
| 7,000,025 B1 | 2/2006 | Wilson | |
| 7,002,926 B1 | 2/2006 | Eneboe et al. | |
| 7,010,607 B1 | 3/2006 | Bunton | |
| 7,024,410 B2 | 4/2006 | Ito et al. | |
| 7,031,615 B2 | 4/2006 | Gentile | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 | 5/2006 | Blumenau et al. | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,076,569 B1 | 7/2006 | Bailey et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B1 | 10/2006 | Goto et al. | |
| 7,124,169 B2 | 10/2006 | Shimozono et al. | |
| 7,150,021 B1 | 12/2006 | Vajjhala et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,187,688 B2 | 3/2007 | Garmire et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,200,610 B1 | 4/2007 | Prawdiuk et al. | |
| 7,209,478 B2 | 4/2007 | Rojas et al. | |
| 7,215,680 B2 | 5/2007 | Mullendore et al. | |
| 7,221,650 B1 | 5/2007 | Cooper et al. | |
| 7,230,929 B2 | 6/2007 | Betker et al. | |
| 7,233,985 B2 | 6/2007 | Hahn et al. | |
| 7,245,613 B1 | 7/2007 | Winkles et al. | |
| 7,248,580 B2 | 7/2007 | George et al. | |
| 7,263,593 B2 | 8/2007 | Honda et al. | |
| 7,266,286 B2 | 9/2007 | Tanizawa et al. | |
| 7,269,131 B2 | 9/2007 | Cashman et al. | |
| 7,269,168 B2 | 9/2007 | Roy et al. | |
| 7,277,431 B2 | 10/2007 | Walter et al. | |
| 7,287,063 B2 | 10/2007 | Baldwin et al. | |
| 7,292,593 B1 | 11/2007 | Winkles et al. | |
| 7,315,511 B2 | 1/2008 | Morita et al. | |
| 7,327,680 B1 | 2/2008 | Kloth | |
| 7,346,707 B1 | 3/2008 | Erimli | |
| 7,352,740 B2 | 4/2008 | Hammons et al. | |
| 2001/0011357 A1 | 8/2001 | Mori | |
| 2001/0022823 A1 | 9/2001 | Renaud | |
| 2001/0033552 A1 | 10/2001 | Barrack et al. | |
| 2001/0038628 A1 | 11/2001 | Ofek et al. | 370/392 |
| 2001/0043564 A1 | 11/2001 | Bloch et al. | |
| 2001/0047460 A1 | 11/2001 | Kobayashi et al. | |
| 2002/0016838 A1 | 2/2002 | Geluc et al. | |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0118692 A1 | 8/2002 | Oberman et al. | |
| 2002/0122428 A1 | 9/2002 | Fan et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0159385 A1 | 10/2002 | Susnow et al. | |
| 2002/0172195 A1 | 11/2002 | Pekkala et al. | |
| 2002/0174197 A1 | 11/2002 | Schimke et al. | |
| 2002/0191602 A1 | 12/2002 | Woodring et al. | |
| 2002/0194294 A1 | 12/2002 | Blumenau et al. | |
| 2002/0196773 A1 | 12/2002 | Berman | |
| 2003/0002503 A1 | 1/2003 | Brewer et al. | |
| 2003/0002516 A1 | 1/2003 | Boock et al. | |
| 2003/0016683 A1 | 1/2003 | George et al. | 370/404 |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0033487 A1 | 2/2003 | Pfister et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0063567 A1 | 4/2003 | Dehart | |
| 2003/0072316 A1 | 4/2003 | Niu et al. | |
| 2003/0076788 A1 | 4/2003 | Grabauskas et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |
| 2003/0093607 A1 | 5/2003 | Main et al. | |
| 2003/0103451 A1 | 6/2003 | Lutgen et al. | |
| 2003/0112819 A1 | 6/2003 | Kofoed et al. | |
| 2003/0115355 A1 | 6/2003 | Cometto et al. | |
| 2003/0117961 A1 | 6/2003 | Chuah et al. | |
| 2003/0118053 A1 | 6/2003 | Edsall et al. | |
| 2003/0120743 A1 | 6/2003 | Coatney et al. | |
| 2003/0120791 A1 | 6/2003 | Weber et al. | |
| 2003/0120983 A1 | 6/2003 | Vieregge et al. | |
| 2003/0126223 A1 | 7/2003 | Jenne et al. | |
| 2003/0126242 A1 | 7/2003 | Chang | |
| 2003/0131105 A1 | 7/2003 | Czeiger et al. | |
| 2003/0137941 A1 | 7/2003 | Kaushik et al. | |
| 2003/0139900 A1 | 7/2003 | Robison | |
| 2003/0172149 A1 | 9/2003 | Edsall et al. | |
| 2003/0172239 A1 | 9/2003 | Swank | |
| 2003/0174652 A1 | 9/2003 | Ebata | |
| 2003/0174721 A1 | 9/2003 | Black et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0179755 A1 | 9/2003 | Fraser | |
| 2003/0189930 A1 | 10/2003 | Terrell et al. | |
| 2003/0189935 A1 | 10/2003 | Warden et al. | |
| 2003/0191857 A1 | 10/2003 | Terell et al. | |
| 2003/0195983 A1 | 10/2003 | Krause | |
| 2003/0198238 A1 | 10/2003 | Westby | |
| 2003/0218986 A1 | 11/2003 | DeSanti et al. | |
| 2003/0229808 A1 | 12/2003 | Heintz et al. | |
| 2003/0236953 A1 | 12/2003 | Grieff et al. | |
| 2004/0013088 A1 | 1/2004 | Gregg | |
| 2004/0013092 A1 | 1/2004 | Betker et al. | 370/254 |
| 2004/0013113 A1 | 1/2004 | Singh et al. | |
| 2004/0013125 A1 | 1/2004 | Betker et al. | 370/419 |
| 2004/0015638 A1 | 1/2004 | Forbes | |
| 2004/0024831 A1 | 2/2004 | Yang et al. | |
| 2004/0028038 A1 | 2/2004 | Anderson et al. | 370/386 |
| 2004/0054776 A1 | 3/2004 | Klotz et al. | |
| 2004/0054866 A1 | 3/2004 | Blumenau et al. | |
| 2004/0057389 A1 | 3/2004 | Klotz et al. | |
| 2004/0064664 A1 | 4/2004 | Gil | |
| 2004/0081186 A1 | 4/2004 | Warren et al. | |
| 2004/0081196 A1 | 4/2004 | Elliott | |
| 2004/0081394 A1 | 4/2004 | Biren et al. | |
| 2004/0085955 A1 | 5/2004 | Walter et al. | |
| 2004/0085974 A1 | 5/2004 | Mies et al. | |
| 2004/0085994 A1 | 5/2004 | Warren et al. | |
| 2004/0092278 A1 | 5/2004 | Diepstraten et al. | |
| 2004/0100944 A1 | 5/2004 | Richmond et al. | |
| 2004/0109418 A1 | 6/2004 | Fedorkow et al. | |
| 2004/0123181 A1 | 6/2004 | Moon et al. | |
| 2004/0141518 A1 | 7/2004 | Milligan et al. | |

| | | | |
|---|---|---|---|
| 2004/0141521 A1 | 7/2004 | George | 370/463 |
| 2004/0151188 A1 | 8/2004 | Maveli et al. | |
| 2004/0153526 A1 | 8/2004 | Haun et al. | |
| 2004/0153914 A1 | 8/2004 | El-Batal | |
| 2004/0174813 A1 | 9/2004 | Kasper et al. | |
| 2004/0202189 A1 | 10/2004 | Arndt et al. | |
| 2004/0208201 A1 | 10/2004 | Otake | |
| 2004/0267982 A1 | 12/2004 | Jackson et al. | |
| 2005/0013258 A1 | 1/2005 | Fike et al. | 370/252 |
| 2005/0013318 A1 | 1/2005 | Fike et al. | 370/462 |
| 2005/0013609 A1 | 1/2005 | Fike et al. | 398/9 |
| 2005/0015517 A1 | 1/2005 | Fike et al. | 709/250 |
| 2005/0015518 A1 | 1/2005 | Wen | 710/1 |
| 2005/0018603 A1 | 1/2005 | Dropps et al. | 370/229 |
| 2005/0018604 A1 | 1/2005 | Dropps et al. | 370/229 |
| 2005/0018606 A1 | 1/2005 | Dropps et al. | 370/230 |
| 2005/0018621 A1 | 1/2005 | Dropps et al. | 370/254 |
| 2005/0018649 A1 | 1/2005 | Dropps et al. | 370/351 |
| 2005/0018650 A1 | 1/2005 | Dropps et al. | 370/351 |
| 2005/0018663 A1 | 1/2005 | Dropps et al. | 370/360 |
| 2005/0018671 A1 | 1/2005 | Dropps et al. | 370/389 |
| 2005/0018672 A1 | 1/2005 | Dropps et al. | 370/389 |
| 2005/0018673 A1 | 1/2005 | Dropps et al. | 370/389 |
| 2005/0018674 A1 | 1/2005 | Dropps et al. | 370/389 |
| 2005/0018675 A1 | 1/2005 | Dropps et al. | 370/389 |
| 2005/0018676 A1 | 1/2005 | Dropps et al. | 370/389 |
| 2005/0018680 A1 | 1/2005 | Dropps et al. | 370/392 |
| 2005/0023656 A1 | 2/2005 | Leedy | |
| 2005/0025060 A1 | 2/2005 | Fike et al. | 370/248 |
| 2005/0025193 A1 | 2/2005 | Fike | 370/503 |
| 2005/0027877 A1 | 2/2005 | Fike et al. | 708/236 |
| 2005/0030893 A1 | 2/2005 | Dropps et al. | 370/229 |
| 2005/0030954 A1 | 2/2005 | Dropps et al. | 370/395.31 |
| 2005/0030978 A1 | 2/2005 | Dropps et al. | 370/512 |
| 2005/0036499 A1 | 2/2005 | Dutt et al. | |
| 2005/0036763 A1 | 2/2005 | Kato et al. | |
| 2005/0044267 A1 | 2/2005 | Dropps et al. | 709/238 |
| 2005/0047334 A1 | 3/2005 | Paul et al. | |
| 2005/0073956 A1 | 4/2005 | Moores et al. | |
| 2005/0076113 A1 | 4/2005 | Klotz et al. | |
| 2005/0088969 A1 | 4/2005 | Carlsen et al. | |
| 2005/0108444 A1 | 5/2005 | Flauaus et al. | |
| 2005/0111845 A1 | 5/2005 | Nelson et al. | |
| 2005/0117522 A1 | 6/2005 | Basavaiah et al. | |
| 2005/0177641 A1 | 8/2005 | Yamagami | |
| 2005/0198523 A1 | 9/2005 | Shanbhag et al. | |
| 2006/0013248 A1 | 1/2006 | Mujeeb et al. | |
| 2006/0034192 A1 | 2/2006 | Hurley et al. | |
| 2006/0034302 A1* | 2/2006 | Peterson | 370/401 |
| 2006/0047852 A1 | 3/2006 | Shah et al. | |
| 2006/0074927 A1 | 4/2006 | Sullivan et al. | |
| 2006/0107260 A1 | 5/2006 | Motta | |
| 2006/0143300 A1 | 6/2006 | See et al. | |
| 2006/0184711 A1 | 8/2006 | Pettey et al. | |
| 2006/0203725 A1 | 9/2006 | Paul et al. | |
| 2006/0274744 A1 | 12/2006 | Nagai et al. | |
| 2007/0206502 A1 | 9/2007 | Martin et al. | |

FOREIGN PATENT DOCUMENTS

| | | |
|---|---|---|
| EP | 0856969 | 8/1998 |
| WO | WO-98/36537 | 8/1998 |
| WO | WO-01/95566 | 12/2001 |
| WO | WO03/088050 | 10/2003 |

OTHER PUBLICATIONS

U.S. Appl. No. 10/961,463, filed Dec. 7, 2007, USPTO.
U.S. Appl. No. 10/961,463, filed Dec. 21, 2007, USPTO.
U.S. Appl. No. 10/899,337, filed Dec. 20, 2007, USPTO.
U.S. Appl. No. 10/798,468, filed Jan. 9, 2008, USPTO.
U.S. Appl. No. 11/608,634, filed Jan. 9, 2008, USPTO.
U.S. Appl. No. 10/889,551, filed Jan. 8, 2008, USPTO.
"Notice of Allowance from USPTO dated Jan. 11, 2008 for U.S. Appl. No. 10/664,548".
"Notice of Allowance from USPTO dated Feb. 8, 2008 for U.S. Appl. No. 10/894,529".
"Notice of Allowance from USPTO dated Jan. 10, 2008 for U.S. Appl. No. 10/263,858".
"Office Action from USPTO dated Feb. 12, 2008 for U.S. Appl. No. 11/057,912".
U.S. Appl. No. 10/889,259, filed Mar. 5, 2008, USPTO.
U.S. Appl. No. 10/894,629, filed Mar. 7, 2008, USPTO.
"Office Action from USPTO dated Mar. 20, 2008 for U.S. Appl. No. 10/894,732".
Curtis, A. R., "Design Considerations for 10-Gbit Fibre Channel", *Curtis A. Ridgeway, Distinguished I/O Architect, Stroage and Computing ASIC's Division, LSI Logic Corp.*
Malavalli, Kumar, "High Speed Fibre Channel Switching Fabirc Devices", Proceedings of the SPIE, SPIE, Bellingham, VA, USA vol. 1577., XP000562869, ISSN: 0277-786X, (Sep. 4, 1991),216-226.
Melhem, et a., "Minimizing Wavelegth Conversions in WDM Path Establishment", *Computer Science Department*, University of Pittsburgh, Pittsburg, PA 15260. (2001), 197-211.
Ridgeway, Curt, "OGFC-40GFC using 4-lane XAUI's", *LSI Logic Presentatio—T11/03-069v0*.
U.S. Appl. No. 10/241,153, filed Sep. 11, 2002, Zone Management In A Multi-Module Fibre Channel Switch.
U.S. Appl. No. 10/263,858, filed Oct. 3, 2002, Method And System For Using Distributed Name Servers In Multi-Module Fibre Channel Switching.
U.S. Appl. No. 10/212,425, filed Aug. 5, 2002, Method And System For Flexible Routing In A Fibre Channel System.
U.S. Appl. No. 10/302,149, filed Nov. 22, 2002, Method And System For Controlling Packet Flow In Networks.
U.S. Appl. No. 10/664,548, filed Sep. 19, 2003, Buffer to Buffer Credit Recovery for In-Line Fibre Channel Credit Extension Devices.
U.S. Appl. No. 10/719,077, filed Nov. 21, 2003, Method and System for Monitoring Events in Storage Area Networks.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, Method and System for Reducing Deadlock in Fibre Channel Fabrics using Virtual Lanes.
U.S. Appl. No. 10/894,529, filed Jul. 20, 2004, Integrated Fibre Channel Fabric Controller.
U. S. Appl. No. 10/957,465, filed Oct. 1, 2004, Method and System for Using Boot Servers in Fibre Channel Network Routing.
U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch for Mixed Switch Fabrics.
U.S. Appl. No. 10/965,718, filed Oct. 1, 2004, Method and System for Using an In-Line Credit Extender with a Host Bus Adapter.
Clark, Tom, "Zoning for Fibre Channel Fabrics", Vixel Corporation Paper - XP002185194., (Aug.1999), pp. 1-6.
Malavalli, Kumar, et al., "Distributed Computing with fibre channel fabric", Proc of the Computer Soc. IntZZZI Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (September 8, 1992), pp. 65-71.
Yoshida, Hu, "LUN Security Considerations for Storage Area Networks," Hitachi Data Systems Paper—XP 002185193 (1999), pp. 1-4.
Claudio DeSanti, "Virtual Fabrics Switch Support"; VF Switch Support, T11/04-395v2. Sep. 2004, pp. 1-15.
Pelissier et al, "Inter-Fabric Routing", dated Jul. 30, 2004, Inter Fabric Routing (04-520v0); pp 1-31.

DeSanti et al, "Virtual Fabrics"; Virtual Fabrics, T11/03-352v0, May 2003; pp. 1-4.
Martin et al, "Virtual Channel Architecture", Presentation by Brocade to T11/03-369V0 dated Jun. 2, 2003- 12 Pages.
"Deliver Server-Free Backup", *Pathlight & Computer Associates*, White Paper of Apr. 2000. Ithaca, New York, XP-002381153, 1-8.
Naik, D., "Inside Windows Storage:Server Storage Technologies for Windows 2000, Windows Server 2003 and Beyond", *Addison-Wesley*, US, Chapter 5, XP-002381152, (Jul. 15, 2003), 137-173.
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008, for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Final Office Action from USPTO dated May 12, 2008 for U.S. Appl. No. 10/984,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,586".
"Final Office Action from USPTO dated Jun. 5, 2008 for U.S. Appl. No. 10/889,267".
"Fianl Office Action from USPTO dated Jun. 10, 2008 for US Application No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl.no. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
International Preliminary Report of Patentability dated Apr. 3, 2007, for International patent application No. PCT/US2005/034844.
International Preliminary Report of Patentability dated Apr. 3, 2007, for International patent application No. PCT/US2005/034758.
International Preliminary Report of Patentability dated Apr. 11, 2007, for International patent application No. PCT/US2005/034845.
International Preliminary Report of Patentability dated Apr. 3, 2007, for International patent application No. PCT/US2005/035064.
International Preliminary Report of Patentability dated Jul. 24, 2007, for International patent application No. PCT/US2005/42528.
"Final Office Action from USPTO dated Aug. 20, 2008 for U.S. Appl. No. 10/798,468".
"Office Action from USPTO dated Sep. 18, 2008 for U.S. Appl. No. 10/894,978".
Brown, Douglas W., "A State-Machine Synthesizer", *18th Design Automation Conference*, (1981),301-305.
"Examination Report from the European Patent Office dated Oct. 12, 2007 for European Application No. 05 805 632.6".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Offic eACtion from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTo dated Jun. 1, 2007 for U.S. Appl. No. 10/961,463".
"Office Action from USPTO dated Sep. 6, 2007 for U.S. Appl. No. 10/889,337".

Malavalli, et al., "FIbre Channel Framing and Signaling (FC-FS) REV 1.10", NCITS working draft proposed American National Standard for Information Technology, (Jan. 25, 2001).

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated May 21, 2007 for U.S. Appl. No. 10/212,425".

"Office Action from USPTO dated Oct. 18, 2006 for U.S. Appl. No. 10/241,153"

"Office Action from USPTO dated Apr. 3, 2007 for U.S. Appl. No. 10/241,425".

"Office Action from USPTO dated Nov. 16, 2007 for U.S. Appl. No. 10/241,153".

"Office Action from USPTO dated Sep. 23, 2008 for U.S. Appl. No. 12/031,585".

"Notice of Allowance from the USPTO dated Sep. 29, 2008 for U.S. Appl. No. 10/889,267".

"Office Action from USPTO dated Nov. 13, 2008 for U.S. Appl. No. 10/894,917".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Notice of Allowance from USPTO dated Oct. 8, 2008 for U.S. Appl. No. 10/889,255".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Nov. 13, 2008 for U.S. Appl. No. 10/894,587".

* cited by examiner

FR_Header Format

| Bits Word | 31 .. 24 | 23 .. 16 | 15 .. 08 | 07 .. 00 |
|---|---|---|---|---|
| 0 | R_CTL | D_ID | | |
| 1 | CS_CTL | S_ID | | |
| 2 | TYPE | F_CTL | | |
| 3 | SEQ_ID | DF_CTL | SEQ_CNT | |
| 4 | OX_ID | RX_ID | | |
| 5 | Parameter | | | |
| 6 | R | Ver(3) | HopCt(4) | Command | R | Pri(3) | DFID(12) |
| 7 | Timestamp | R | V | C | SFID(12) |

FIGURE 1G

ADDRESS TRANSLATION IN FIBRE CHANNEL SWITCHES

BACKGROUND

1. Field of the Invention

The present invention relates to Fibre Channel networks, and more particularly, to address translation in Fibre Channel switches.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port".

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel switches use memory buffers to hold frames received and sent across a network. Associated with these buffers are credits, which are the number of frames that a buffer can hold per fabric port.

Fibre Channel standards are now being extended for use with expanded Fabrics and in storage virtualization. Storage virtualization defines virtual storage units for end-users and maps virtual storage units to actual physical storage locations.

Fibre Channel proposed standard, T11/04-5200v0, incorporated herein by reference in its entirety describes multiple Fabrics and how they should be interconnected. FIG. 1F shows a block diagram of a system having multiple fabrics. Fabrics A,B,C,D,E and F are individual Fabrics. Host I1 attached to Fabric A uses Fabric Routers 1, 2 3, or 4 to communicate with devices T2 and T3. A Fabric Router is a Fibre Channel device that allows Fibre Channel devices, via N_Ports, to be shared among multiple independent Fibre Channel fabrics.

Fibre Channel proposed standard T11/04-395V2, incorporated herein by reference in its entirety, describes how Virtual Fabrics operate.

Commercial Fibre Channel switches fail to provide a system and method that can support such expanded functionality of Fibre Channel switches and accommodate various addressing schemes that are required to enable a switch to function properly in inter-fabric and virtual fabric routing.

Therefore, there is a need for a method and system for efficiently performing address mapping for a Fibre Channel switch that may operate in different environments, for example, multiple fabrics, virtual fabrics and storage virtualization.

SUMMARY OF THE PRESENT INVENTION

In one aspect of the present invention, a method for processing frames in a fibre channel network is provided. The method includes, determining if an incoming frame includes a FR_Header; determining if there is a match from an address mapping cache; routing the frame as a local fabric frame, if there is no match from the address mapping cache and the incoming frame did not include a FR_Header; and building a FR_Header if there is a match from the address mapping cache and the incoming frame did not include a FR_Header and updating the incoming frame so that it can be routed to a local fabric or remote fabric destination. The cyclic redundancy code ("CRC") is updated for the incoming frame.

The method further includes, routing the incoming frame as an inter-fabric frame if there is no match from the address mapping cache and the incoming frame includes a FR_Header.

The method also includes, removing the FR_Header if the incoming frame includes a FR_Header and there is a match from the address mapping cache; and modifying an incoming frame header so that the incoming frame can be routed as a local fabric frame. The incoming frame is modified so that a proxy address can be used for routing the frame and the proxy address will depend on whether a frame is destined for a local or remote fabric.

In yet another aspect of the present invention, a method for processing fibre channel frames in a transmit segment of a fibre channel switch is provided. The method includes, determining if a transmit frame includes a FR_Header; determining if there is a match from an address mapping cache; routing a transmit frame to a local fabric device if there is no matching entry from an address mapping cache; and building a FR_Header and updating a transmit frame header if there is no FR_Header in the transmit frame and there is a match from the address mapping cache, wherein a D_ID and/or S_ID in the transmit frame header is updated. The CRC is also updated in the transmit frame.

The method further includes, routing a transmit frame as an inter-fabric frame, if the transmit frame includes a FR_Header and there is no match from the address mapping cache. The FR_Header in the transmit frame is used to send the frame to a destination that may be located in a remote fabric.

The method also includes, deleting a FR_Header if the transmit frame includes a FR_Header and there is a match from the address mapping cache; and routing the transmit frame as a local fabric frame.

In yet another aspect of the present invention, a fibre channel switch element is provided. The switch element includes a port with an address mapping cache that receives an incoming fibre channel frame in a receive and/or transmit segment, wherein the address mapping cache compares a D_ID of an incoming frame in the receive segment and/or a S_ID in the transmit segment; and if a FR_Header is received then a D_ID or S_ID is compared from a fibre channel header that follows the FR_Header; and if a compare fabric identifier flag is set, then the fabric identifier is compared.

In yet another aspect of the present invention, a fibre channel switch element is provided. The switch element includes, a port with an address mapping cache that is used for routing frames from one virtual fabric to another by comparing a VF_ID field to a Virtual fabric identifier in a VFT_Header. If a received frame includes a VFT_Header and a VF_ID and a D_ID and a S_ID match address mapping cache entries, then the VF_ID, D_ID and S_ID values are replaced.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1G shows the standard FR_Header format that is used according to one aspect of the present invention;

DETAILED DESCRIPTION OF THE PREFERRED EMBODIMENTS

Figure 1A:
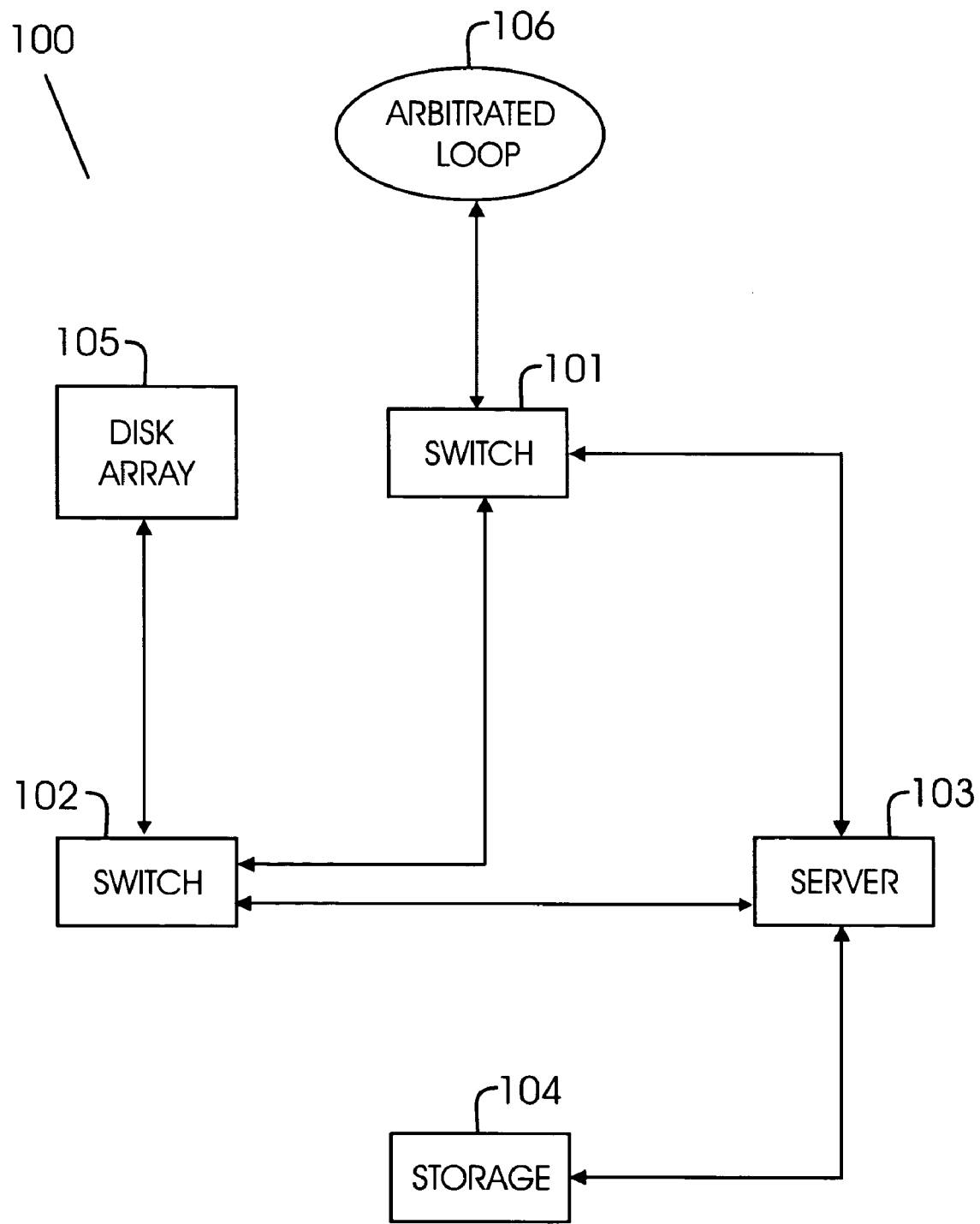
FIG. 1A shows an example of a Fibre Channel system.

Definitions:

The following definitions are provided as they are typically (but not exclusively) used in the Fibre Channel environment, implementing the various adaptive aspects of the present invention.

"D_ID": A 24-bit Fibre Channel header field that contains the destination address for a frame.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others. This standard includes information regarding Virtual Fabric headers.

"Fabric": The structure or organization of a group of switches, target and host devices (NL_Port, N_ports etc.).

"Fabric Identifier" (may also be referred to as "Fabric ID"): An identifier that is used to identify a Fabric for a Fabric Router function.

"Fabric Router": A Fibre Channel device that allows Fibre Channel Devices, via N_Ports to be shared among multiple independent Fibre Channel Fabrics.

"Fabric Topology": This is a topology where a device is directly attached to a Fibre Channel Fabric that uses destination identifiers embedded in frame headers to route frames through a Fibre Channel fabric to a desired destination.

"FR_Header": A header format (shown in FIG. 1G) defined by T11/04-520v0 for a Fabric Router for routing frames between different Fabrics.

"OX_ID": An Originator (i.e., a device/port that originates an exchange) Exchange identification field in a Fibre Channel frame header.

"N_Port": A direct fabric attached port, for example, a disk drive or a HBA.

"NL_Port": A L_Port that can perform the function of a N_Port.

"Port": A general reference to N. Sub.—Port or F.Sub.—Port.

"RX_ID": A responder (i.e., a device/port that responds) exchange identification field in a Fibre Channel frame header.

"SAN": Storage Area Network

"S_ID": A 24-bit field in a Fibre Channel frame header that contains the source address for a frame.

"Switch": A fabric element conforming to the Fibre Channel Switch standards.

"VFT_Header": A Virtual Fabric tagging header as described in FC-FS-2 standard that allows a Fibre Channel frame to be tagged with a VF_ID. Frames with a VFT_Header may be transmitted over the same physical link.

"VF_ID" (or "VSANID"): A Virtual Fabric identifier that identifies a frame's Virtual Fabric.

"Virtual Fabric" ("VSAN"): These are Fabrics that are created by using virtual partitions in a physical Fibre Channel Fabric.

In one aspect of the present invention, an address mapping cache (or logic) is provided at a Fibre Channel switch port for address translation of Fibre Channel frames. The address mapping cache includes plural entries that are programmed by switch firmware. When a frame arrives at a switch port (on the receive or transmit side), address mapping cache field entries are compared to address fields in the Fibre Channel frame itself. If any entry matches, the substitute data stored in a cache entry is inserted in the frame (or a frame entry is altered by adding or subtracting a certain offset value), before the frame is routed.

To facilitate an understanding of the preferred embodiment, the general architecture and operation of a Fibre channel System and a Fibre Channel switch element will be described. The specific architecture and operation of the preferred embodiment will then be described with reference to the general architecture.

Fibre Channel System:

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 1B:
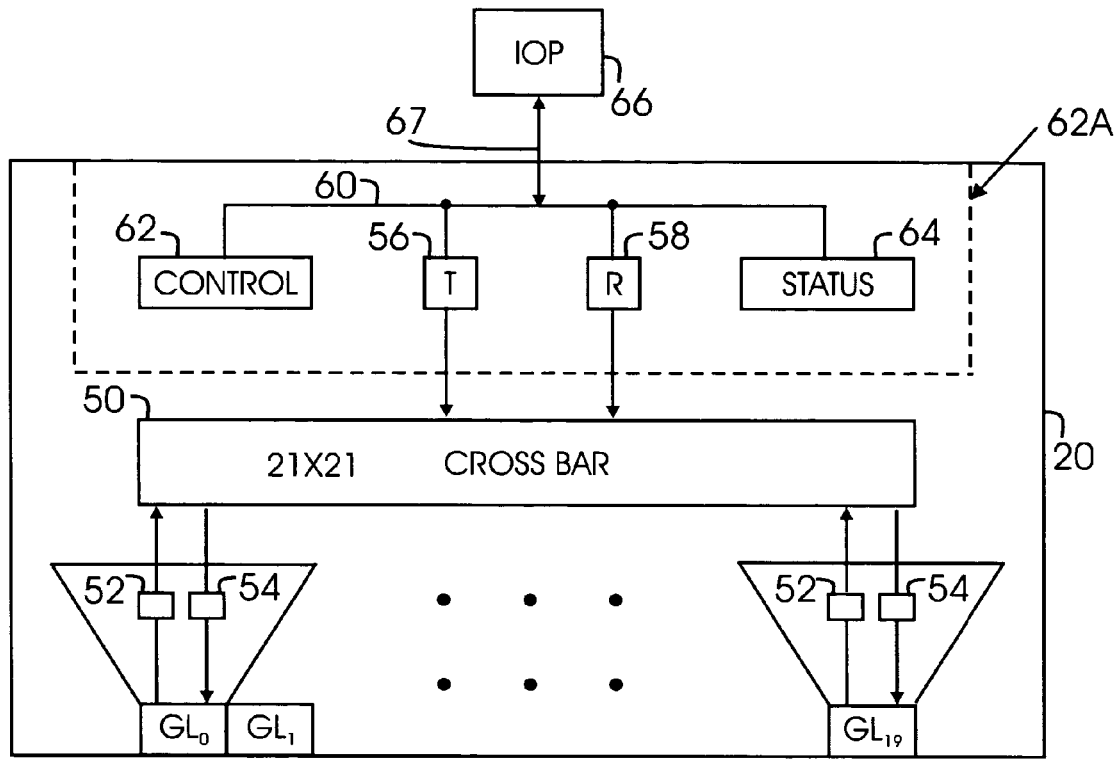
FIG. 1B shows an example of a Fibre Channel switch element, according to one aspect of the present invention.

Fibre Channel Switch Element:

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common FibreChannel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
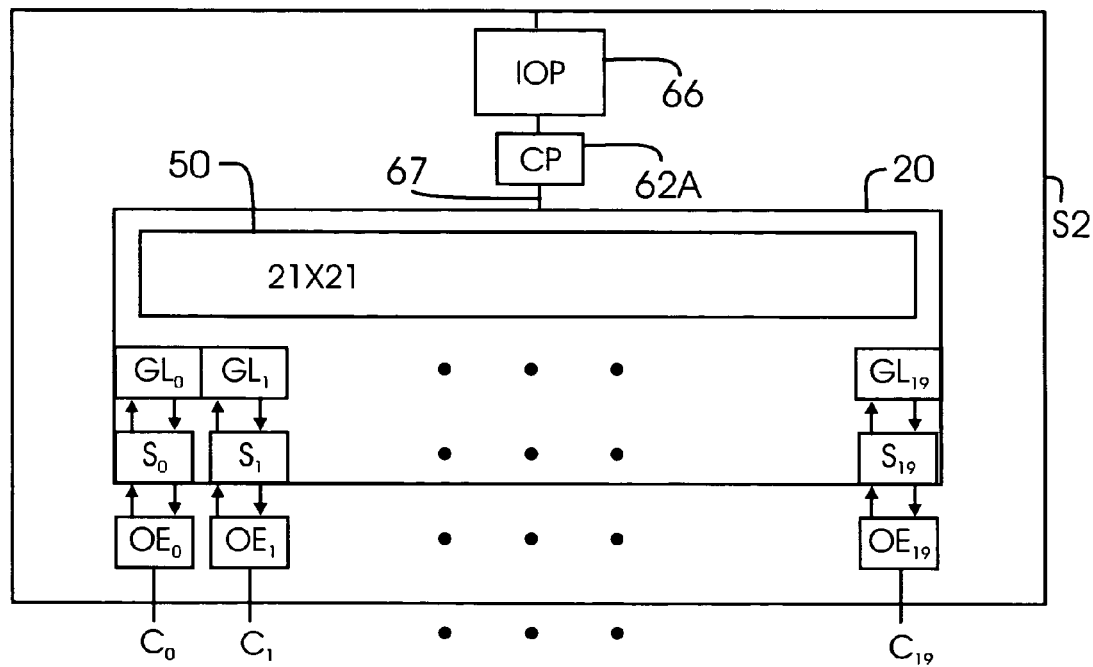
FIG. 1C shows a block diagram of a 20-channel switch chassis, according to one aspect of the present invention.

In the preferred embodiments of switch chassis described herein, the fabric controller is a firmware-programmed microprocessor, also referred to as the input/output processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
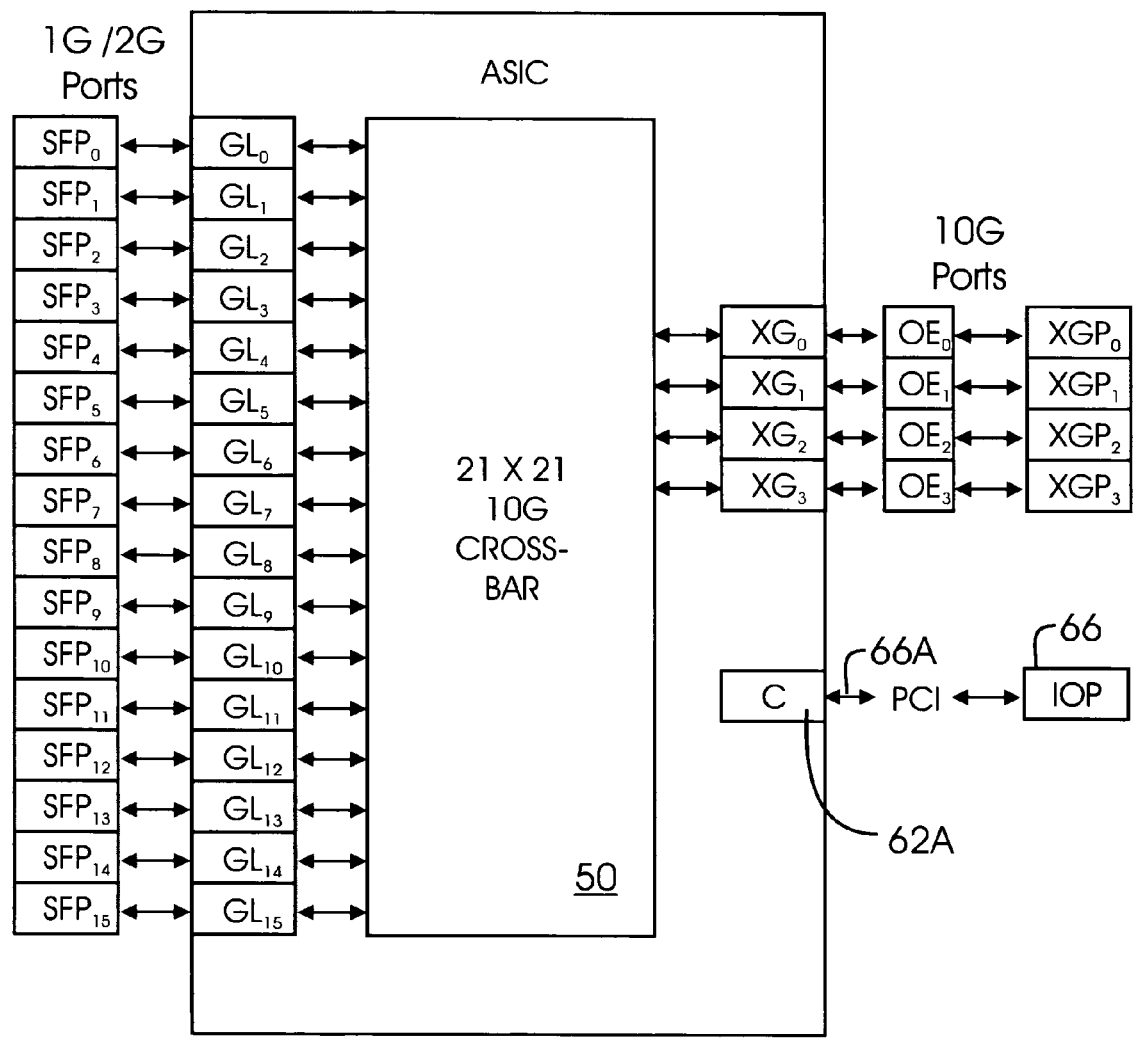
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figure 1E:
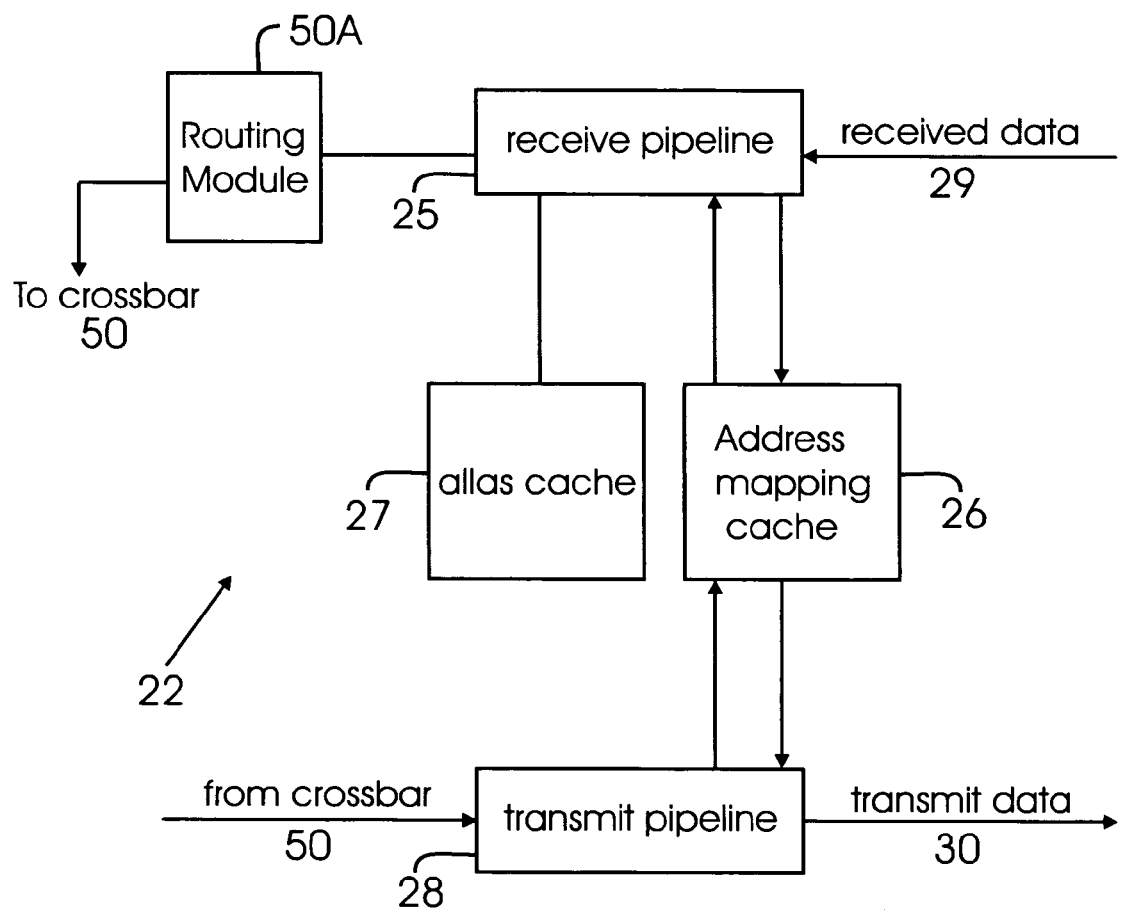
FIG. 1E shows a block diagram of a switch port using an address mapping cache, according to one aspect of the present invention.

FIG. 1E shows an example of a port 22, according to one aspect of the present invention. Port 22 includes a receive pipeline that receives Fibre Channel frames/data 29. Received data 29 is processed and then moved to the transmit pipeline 28 via routing module 50A and crossbar 50. The transmit pipeline 28 transmits data 30 to the destination. Details of the pipelines, routing module 50A and how frames are transmitted using alias cache 27 are provided in the patent application Ser. No. 10/894,596, filed on Jul. 20, 2004, the disclosure of which is incorporated herein by reference in its entirety.

Port 22 also includes an Address Mapping cache 26 that substitutes/or adds/subtracts an offset value to certain fields in frames being received or transmitted by port 22, as described below.

Figure 2:
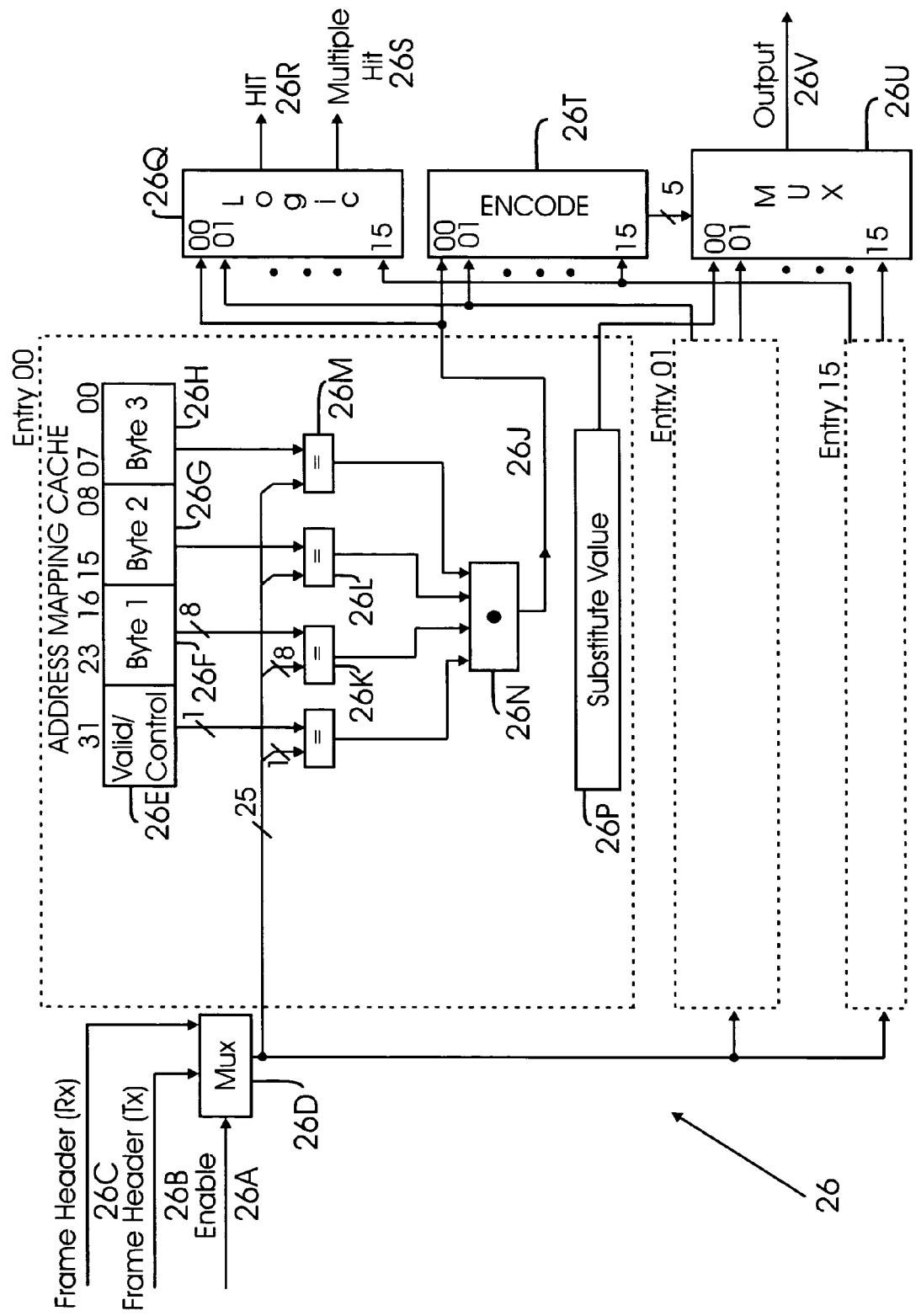
FIG. 2 shows a logic diagram of an address mapping cache, according to one aspect of the present invention.

Address Mapping Cache 26:

FIG. 2 shows a detailed logic diagram of Address Mapping cache 26 (may also be referred to as cache 26) with entries 00 to entry 15 (i.e. 16 entries). Entry 00 includes 26P, a substitute entry value that is used to substitute certain frame header values.

It is noteworthy that although various bit values are shown in FIG. 2, the adaptive aspects of the present invention are not limited to any particular bit value.

Cache 26 includes a multiplexer 26D that receives frame header information 26C in the receive side and/or frame header information 26B for frames on the transmit side. Command/signal 26A enables frame header comparison in the receive or transmit path.

Incoming frames information (or fields) (26B and/or 26C) are compared by logic 26K, 26L and 26M with entries 26F, 26G and 26H, respectively. A valid/control bit 26E is set for a valid cache entry. Logic 26N generates a command/signal (output 26J) based on the comparison. Output 26J is sent to logic 26Q that generates a hit signal 26R or a multiple hit signal 26S. If a multiple hit signal 26R is generated, then the lowest entry number may be used and an error or warning status is set and sent to IOP 66.

Output 26J is also sent to an encoder module 26T, whose output is sent to MUX 26U. If hit signal 26R is generated then a substitute value from the cache entry (26P) is inserted into the frame header. This is shown as 26V in FIG. 2.

Address Mapping Cache 26 as used for a Fabric Router:

Various fields may be set in cache 26 and compared with header information 26B and 26C. Signal/command/bit 26A and 26E are used to enable comparison of frame fields with cache 26 entries and also determine what happens after the comparison, i.e., substitute new values based on cache 26 entries; or ignore the results of the comparison. As described below, there are three types of fields that are used by Cache 26 for processing frames to/from Fabric Routers:

Compare Fields: The "compare fields" include port address and the fabric identifier field in a FR_Header. The port address may be a D_ID (in the receive path) or S_ID (for the transmit path). If a FR_Header is received, then the D_ID or S_ID is compared from a Fibre Channel header that follows the FR_Header.

Control Fields/Flags: These flags are present in 26E and determine how and which fields are compared at a switch port.

A FR_Header flag may be set to compare the FR_Header. If the flag is set, then the FR_Header is compared if the Fabric identifier ("ID") matches. The presence of an FR_Header is indicated by a hex 0x51 value for the R_CTL field in a fibre channel frame. If this flag is clear then the Fabric ID is not compared.

A "Compare Fabric ID" only flag may be set to compare Fabric IDs. If this flag is set, a match occurs if a FR_Header is present and the Fabric ID in the address mapping cache 26 is equal to the Fabric ID in the frame header. In this case, the D_ID and S_ID are not compared.

If the FR_Header flag is clear then the "Compare Fabric ID" flag is ignored.

If the FR_header flag is set and the Compare Fabric ID flag is cleared, then the Fabric ID and either the D_ID or S_ID is compared.

A "Use D_ID" flag indicates to cache 26 to compare and substitute the D_ID. If the flag is cleared then the S_ID is compared and substituted.

Output Fields 26V:

New Port Address Substitution: A New Port Address field (26V) is substituted if the compare logic in FIG. 2 provides a match (26R). If a substitute D_ID value is set (in 26P), then the set D_ID is used for substitution, otherwise the S_ID is used. If the FR_Header is being added, then the FR_Header is added to the original D_ID or S_ID. If the FR_Header is being deleted, then the substitution occurs after the deletion. If an existing FR_header is preserved, then a substitute value is added in the D_ID or the S_ID of the FR_Header.

Add Header Flag: If this option is set, then a FR_Header is added to an incoming frame.

1. Delete Header Flag: if this option is set, then after the comparison, the FR_Header is removed.

New Fabric ID: A new Fabric ID is used for a destination Fabric associated with a proxy port address that matches a cache 26 entry on a received frame. The Fabric ID may be a part of the FR_Header added to the frame.

Figure 4:
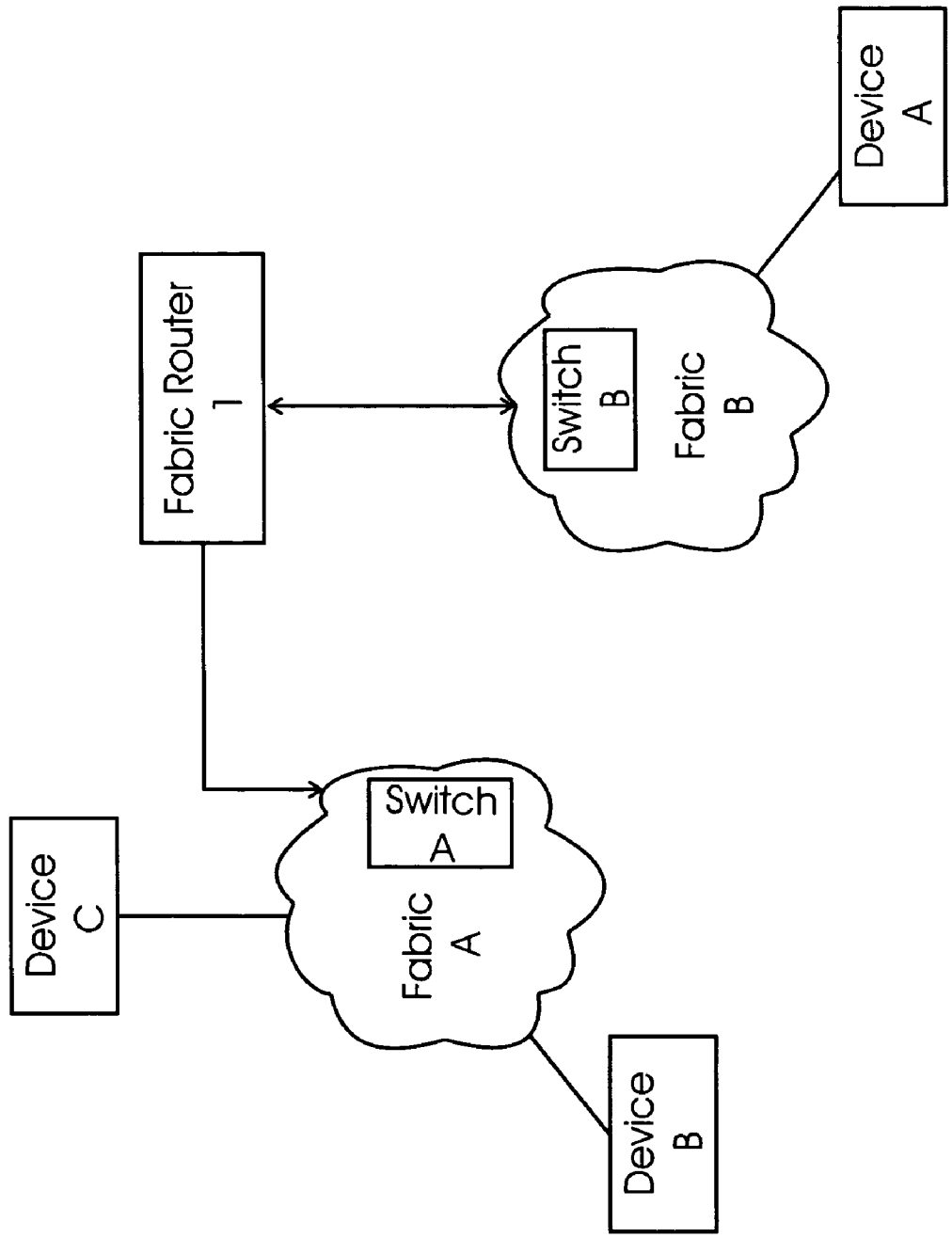
FIG. 4 shows a block diagram for illustrating the difference between a local and remote fabric.

Processing Frame on the Receive Side:

Frames received by port 22 may be local or inter-fabric. FIG. 4 shows a block diagram illustrating the concept of local versus inter-fabric frames. If device B sends a frame to switch A in fabric A and the frame is destined for device C that is also coupled to Fabric A, then the frame is a local frame. If a frame sent from device B is destined for device A that is coupled to Fabric B, then the frame is an "inter-fabric" frame Cache 26 is used for processing both local and inter-fabric frames, as described below.

Figure 3:
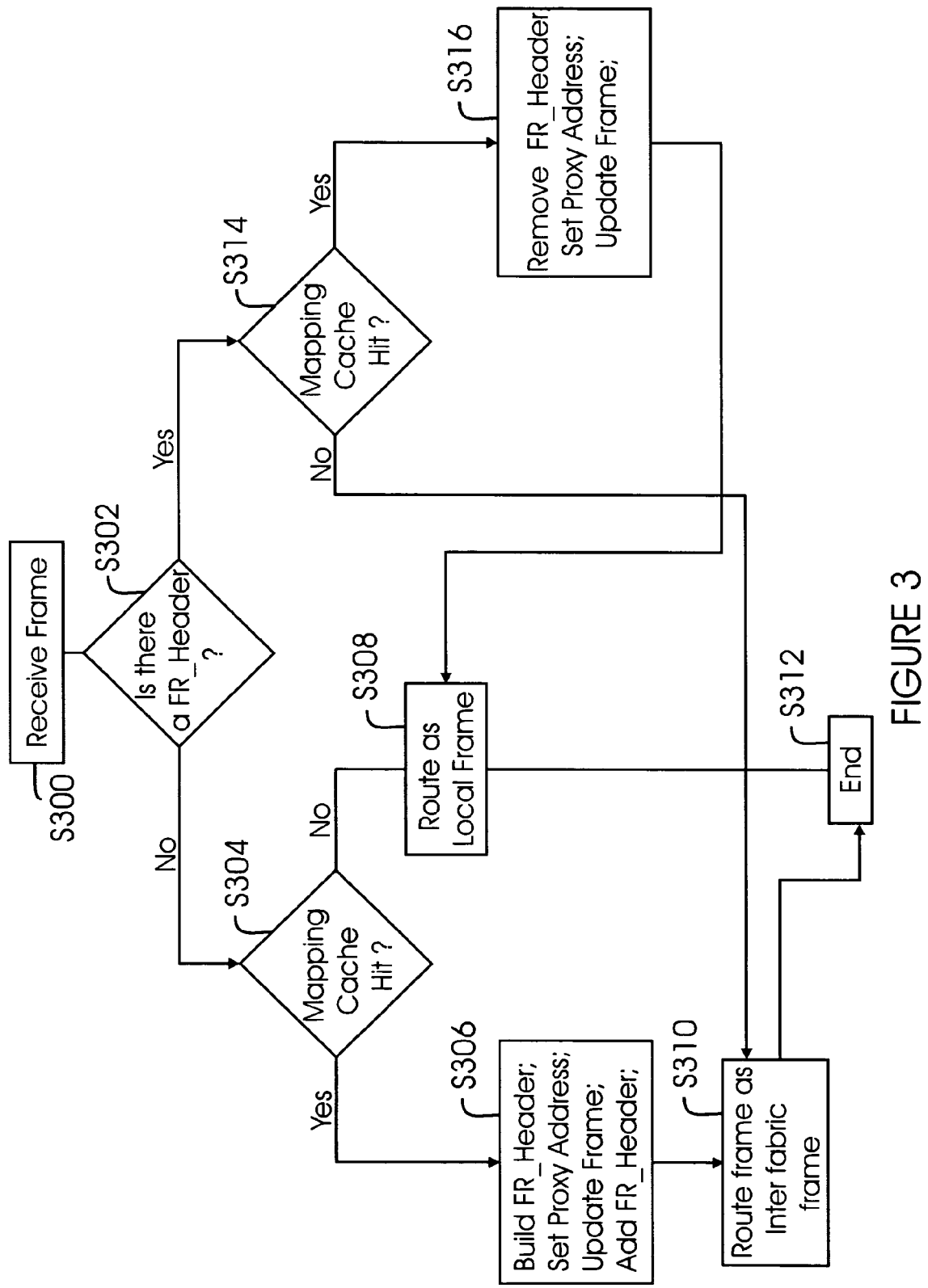
FIG. 3 shows a process flow diagram for processing frames on the receive side.

FIG. 3 shows a process flow diagram for processing frames that are received on RPORT of a switch port 22 (shown as data 29 in FIG. 1E).

In step S300, a frame 29 is received by pipeline 25. In step S302, the receive pipeline 25 determines whether incoming frame 29 includes a FR_Header. The presence of the FR_Header indicates to the switch 22 that the received frame may require inter-fabric routing.

If there is no FR_Header, the process determines in step S304, if there is an address mapping cache hit (26R). If there is no hit, then in step S308, the frame 29 is routed as a local fabric frame.

If there is a hit in step S304, then in step S306, frame 29 is modified. This begins by building a FR_Header. The Port Address (for port 22) is set to a proxy address assigned to a device with a different Fabric ID.

Figure 1F:
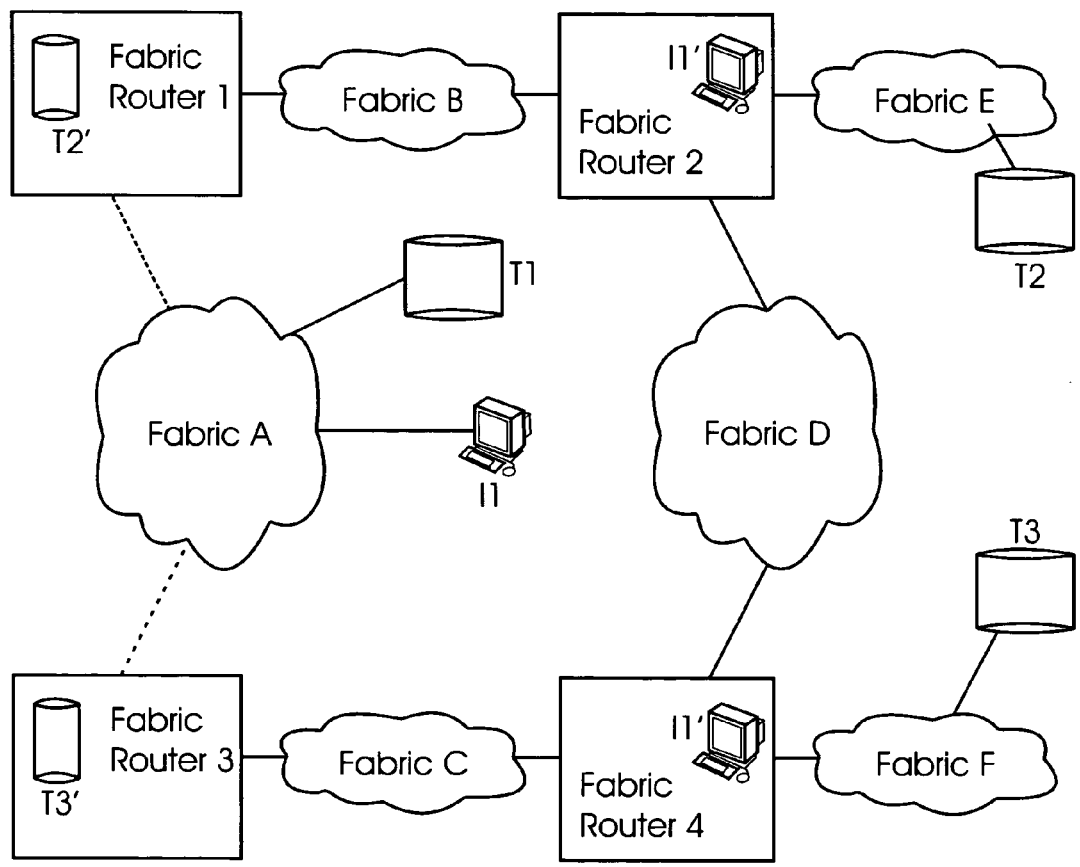
FIG. 1F shows a block diagram of a system with multiple fabrics that can use the address mapping scheme, according to one aspect of the present invention.

A proxy address is used to allow a physical device to be shared among multiple fabrics. For example, device T1 that is attached to Fabric A in FIG. 1F is a host device while Fabric A is a host Fabric. The other Fabrics that intend share device T1 (for example, Fabric E) are Proxied Fabrics.

A FR_Header is also added and both D_ID and S_ID values may have to be modified. The frame is updated with a new Fabric ID and possibly with a new cyclic redundancy code ("CRC"). Every frame has a CRC code that is used for data integrity, and by updating the CRC, the data integrity is ensured, especilayy with the changes that are made to the frame headers.

In the example given above with respect to FIG. 4, if device B is sending the frame to device A, then the Fabric ID for Fabric A is inserted. This allows switch A to send the frame to switch B and also Switch B can recognize that the frame is coming from switch A in fabric A. This allows routing module 50A in step S310 to route frame 29 as an inter-fabric frame.

If the process determines in step S302, that frame 29 has a FR_Header, then in step S314, the process determines if there a cache 26 hit (26R). If there is no hit, then the frame is routed in step S310, with the existing FR_Header. The frames are routed by routing module 50A using a destination Fabric ID.

If there is a hit in step S314, then in step S316, the FR_Header is removed in step S316. Although the frame came from a different fabric, it is modified so that it can be routed to the local fabric. A proxy address is set and the frame is updated possibly with a new CRC. It is noteworthy that this step (S316) may also be performed on the transmit side.

Thereafter, the frame is routed in step S308, as a local frame and the process ends in step S312.

Processing Frames on the Transmit Side:

Two types of frames may be transmitted from a transmit port of switch element 20. First type of frame has a final destination on a directly attached Fabric (may be designated as a "Local Fabric") and the second type is destined for other Fabrics (may be designated as "Remote Fabrics").

Figure 5:
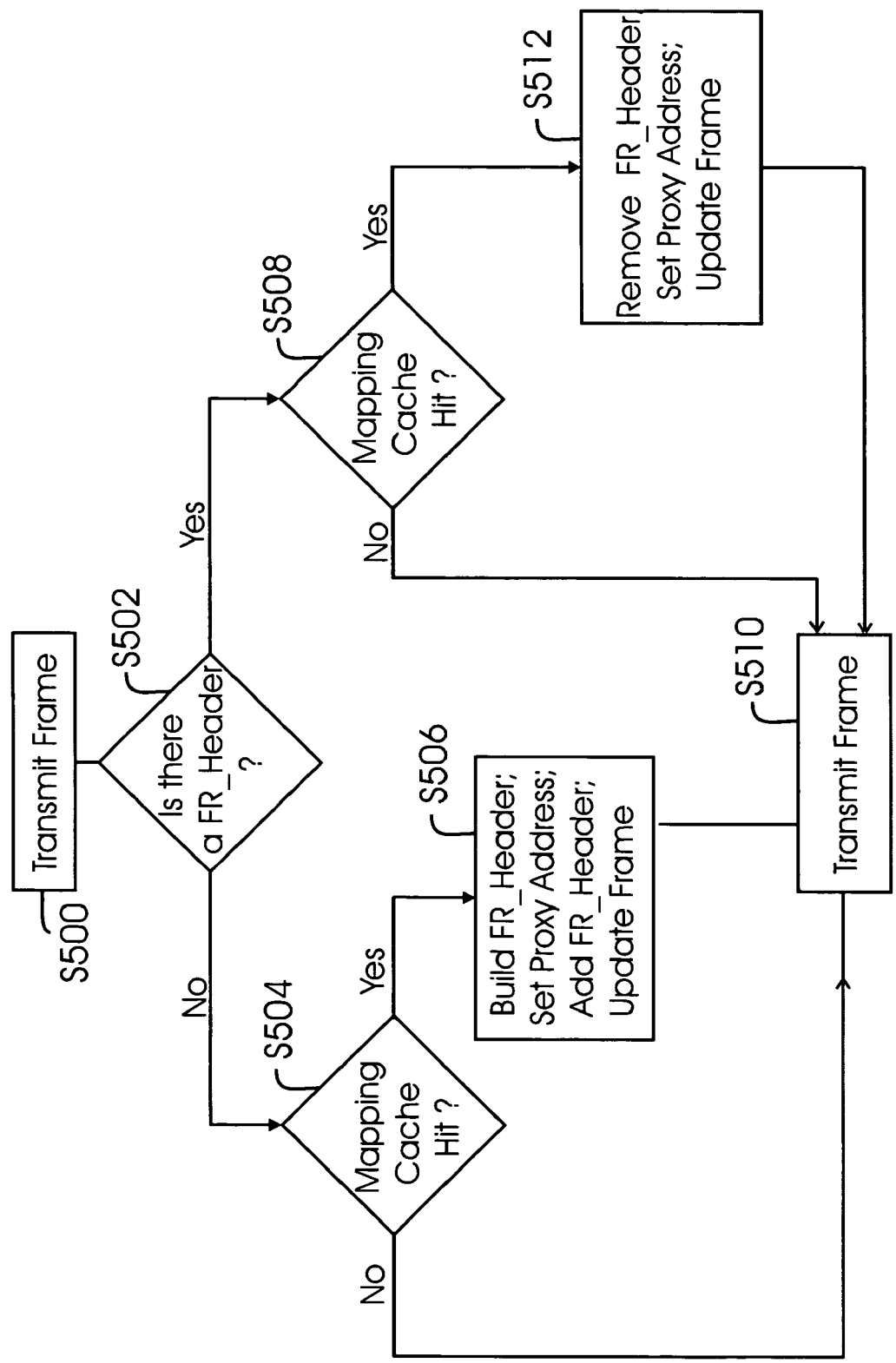
FIG. 5 shows a flow diagram for processing frames on the transmit side.

FIG. 5 shows a block diagram for processing frames on the transmit side using cache 26, according to one aspect of the present invention. In step S500, a "receive port flag" is cleared, which activates the use of frame header 26B on the transmit side.

In step S502, the process determines, if a FR_Header is present in the frame (that needs to be transmitted, also referred to as a "transmit frame"). If a FR_Header is not present, then in step S504, the process determines, if there is a cache 26 hit (26R). If there is no hit, the transmit frame is assumed to be a local fabric frame and the destination is assumed to be a device that is attached to the local fabric. In step S510, the transmit frame is routed to a local Fabric destination.

If there is a hit in step S504, then the transmit frame may be destined for a local or remote fabric. Depending on the type (i.e. destination) of the transmit frame, in step S506, a FR_Header is built. A proxy address is set for the address of the current port (for example, 22). A FR_Header is added and the frame is updated. The Fabric ID in the transmit frame is set to a destination Fabric ID (remote or local).

If the destination Fabric ID in a FR_Header matches the destination Fabric ID in a cache 26 entry, then the D_ID in the FR_Header is replaced with a new port address from a cache entry (26P). The same may be performed for the S_ID. After step S506, the transmit frame is transmitted in step S510.

If a FR_Header is present in step S502, then in step S508, the process determines if there is a cache 26 hit. If there is no hit, then in step S510, the transmit frame is transmitted to a remote fabric.

If there is a hit, then in step S512, the FR_Header is removed because the transmit frame is destined to a local Fabric device, although it came in as an inter-fabric frame. The FR_Header is removed and the proxy address for the transmit port is set up, so that the frame can be routed in step S510 as a local fabric frame.

Cache 26 as used for Virtual Fabrics:

Cache 26 may also be used to route frames from one Virtual Fabric to another. Addresses for a Virtual fabric destination are assigned a proxy address on a source (local) Virtual Fabric. The source port is assigned a proxy address for the destination Virtual Fabric.

Cache 26 uses the following entries for a Virtual Fabric:

Fields that are compared by cache 26:

VF_ID (or "VSANID"): This field is compared to the Virtual Fabric ID from a VFT_Header;

D_ID: Destination address is assigned as a proxy for destination Virtual Fabric address; and S_ID: Source address.

Out Fields (26V):

New VF_ID: This replaces the original VF_ID to get to a destination Virtual Fabric.

New D_ID: Address of a destination on the destination Virtual Fabric.

New S_ID: Address assigned as a proxy by destination Virtual Fabric for a source port.

All mapping is performed on received frames (26C). If a received frame has a VFT_Header and the VF_ID, and D_ID and the S_ID match cache 26 entries, then the VF_ID, D_ID and S_ID are replaced by new values (26P). The destination port also has a cache 26 entry to map reply frames back to the source Virtual Fabric and port address. Once the address mapping is performed, the frame is routed just like any other frame with a VFT_Header.

Figure 6A:
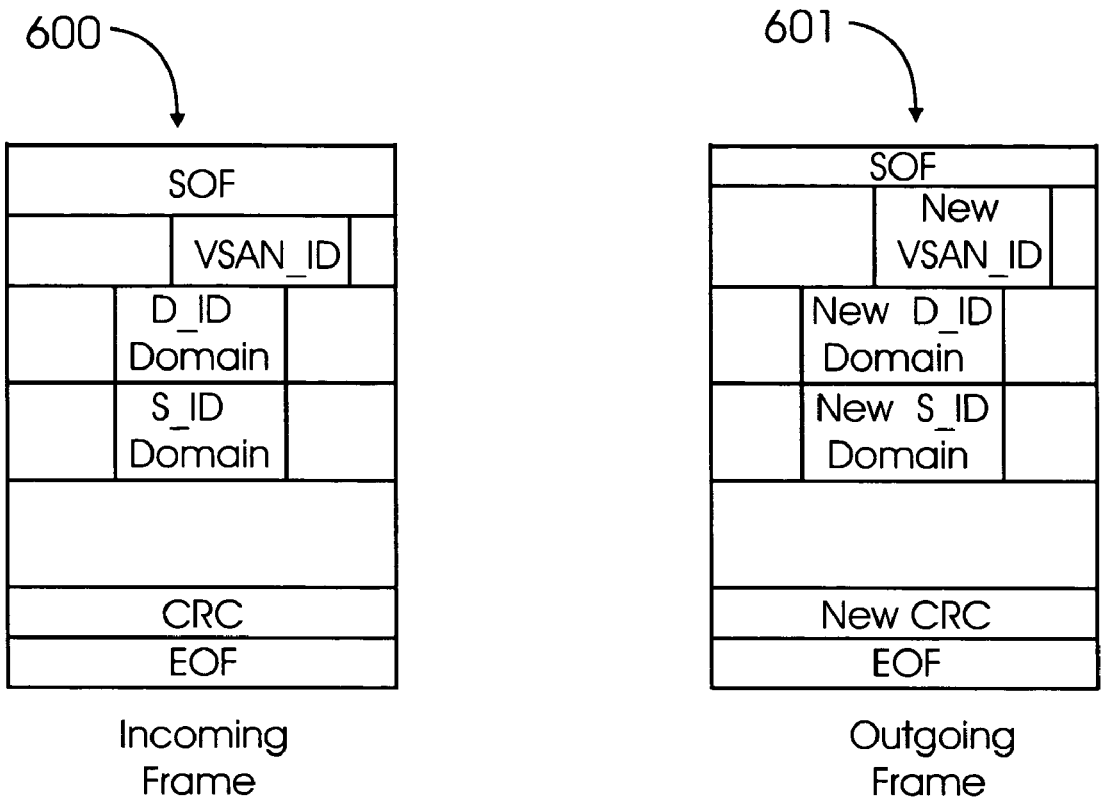
FIGS. 6A-6B show block diagrams of how the address mapping cache may be used in a VSAN, according to one aspect of the present invention.
Figure 6B:
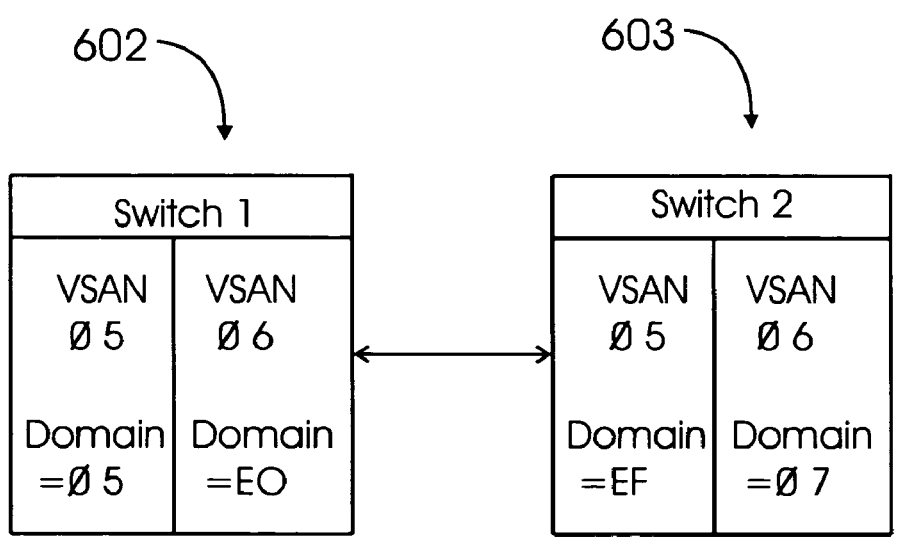

FIG. 6A shows an example of an incoming frame 600 with a VSAN_ID (or VF_ID, used interchangeably throughtout this specification). An outgoing frame is shown as 601 and includes a new VSAN_ID, a new D_ID and S_ID. FIG. 6B shows an example of how the field values change between two switches 1 and 2 that may be located in different VSANs. The values that are shown in FIG. 6B are just to illustrate how cache 26 is used for Virtual Fabrics. For example, an incoming frame has the following values: VSAN_ID=05, D_ID Domain=EF, and S_ID domain=05. An outgoing frame has VSAN_ID=06, D_ID Domain=07, and S_ID domain=E0.

Using Cache 26 for Storage Virtualization: Storage devices (for example, 104 and 105) are coupled using the Small Computer Systems Interface ("SCSI") protocol and use the SCSI Fibre Channel Protocol ("SCSI FCP") to communicate with other devices/systems. Both the SCSI and SCSI FCP standard protocols are incorporated herein by reference in their entirety. SCSI FCP is a mapping protocol for applying SCSI command set to Fibre Channel.

Cache 26 assists in storage virtualization by mapping virtual address to physical addresses. The following fields are used for storage virtualization:

Port Address: This is compared to either the D_ID or S_ID.

Control Fields: A control field/flag is set to process a receive frame (26C). If the flag is cleared, then transmit side (26B) frames are processed.

Output Fields (26V):

If a receive frame flag is set, then the D_ID in the frame is replaced with a matching cache 26 entry. If the receive frame flag is not set, then the S_ID is replaced.

Incoming Frames:

The following describes how incoming frames (26C) are handled. The "receive frame" flag, set port address to a destination address, and set new port address to a substitute destination address flags are set.

When a frame is received and the D_ID matches a cache 26 entry (26R), then the frame D_ID is replaced with a new port address from cache 26.

Outgoing Frames:

The following describes how outgoing frames (26B) are handled. The "receive frame" flag is cleared; and set port address to frame source address, and set new port address to original source address that was remapped in the receive side flags are set.

When a frame is received and the S_ID matches a cache 26 entry (26R), then the frame S_ID is replaced with a new port address from cache 26. These entries are used to map a reply frame source address back to the original address used by frames coming into the port that was mapped.

Although the present invention has been described with reference to specific embodiments, these embodiments are illustrative only and not limiting. Many other applications and embodiments of the present invention will be apparent in light of this disclosure and the following claims.

What is claimed is:

1. A method for processing frames in a fibre channel network, comprising:
   (a) determining if an incoming frame received at a receive segment of a port of a fibre channel switch element includes an inter fabric frame header ("FR_Header");
   (b) if there in no FR_Header in step (a), determining if there is a match from a hardware based address mapping cache;
   (c) routing the frame as a local fabric frame, if there is no match from the address mapping cache in step (b) and the incoming frame did not include the FR_Header as determined in step (a);
   (d) if there is said match from the address mapping cache in step (b) and the incoming frame did not include the FR_Header as determined in step (a) building the FR_Header; and
   (e) updating the incoming frame with a new fabric identifier so that the incoming frame is routed as an inter-fabric frame or as the local fabric frame.

2. The method of claim 1, further comprising;
   routing the incoming frame as the inter-fabric frame after determining that there is no match from the address mapping cache and the incoming frame includes the FR_Header as determined in step (a) of claim 1.

3. The method of claim 1, further comprising:
removing the FR_Header, if the incoming frame includes the FR_Header, as determined in step (a) of claim 1 and after determining that there is said match from the address mapping cache; and
modifying the incoming frame header so that the incoming frame can be routed as the local fabric frame.

4. The method of claim 1, wherein the incoming frame is modified in step (d) of claim 1 with a proxy address for the port and the proxy address depends on whether the incoming frame destination is for a local fabric or a remote fabric.

5. The method of claim 1, wherein a cyclic redundancy code ("CRC") is updated for the incoming frame.

6. The method of claim 1, wherein the address mapping cache uses a compare field, a control field and an output field for routing the incoming frame;
wherein the compare field includes a port address and a fabric identifier field in an inter-fabric frame identifier header ("FR_Header"); the port address includes a destination identifier (D_ID) and a source identifier (S_ID); and if the FR_header is present in the incoming frame, then to route the frame, the D_ID is compared;
wherein the control field includes (i) a FR_Header flag, which if set, is used to compare the FR_Header field in the incoming frame; and if the FR_Header flag is not set, then FR_Header field is ignored; (ii) a compare fabric identifier only flag, which when set, is used to compare a fabric identifier; and (iii) a D_ID flag, which when set, is used to compare and substitute the D_ID; and
wherein he output field includes (i) a new port address field that is used for address substitution when using one of the compare fields provides a match; (ii) an add header flag, which when set, is used to add the FR_Header to the incoming frame; (iii) a delete header flag, which when set, is used to remove the FR_header flag; and (iv) a new fabric identifier that is used for a destination fabric associated with proxy address that matches an address map cache entry.

7. A method for processing fibre channel frames in transmit segment of a port of a fibre channel switch element, comprising:
(a) determining if a transmit frame includes an inter-fabric frame header ("FR_Header");
(b) if the FR_Header is not present in step (a), determining if there is a match from a hardware based address mapping cache;
(c) routing the transmit frame to a local fabric if there is no matching entry from an address mapping cache in step (b); and
(d) if there is no FR_Header in the transmit frame in step (a) and there is said match from the address mapping cache in step (b); building the FR_Header for the transmit frame, wherein the FR_Header depends on whether the destination fabric of the transmit frame is the local fabric or a remote fabric, and the FR_Header is inserted in the transmit frame with a fabric identifier for the destination fabric.

8. The method of claim 7, further comprising:
routing the transmit frame as an inter-fabric frame, if the transmit frame includes said FR_Header as determined in step (a) of claim 7, and if there is no match from the address mapping cache.

9. The method of claim 7, further comprising:
if the transmit frame includes the FR_Header in step (a) of claim 1; deleting the FR_Header after determining that there is said match from the address mapping cache; and routing the transmit frame as the local fabric frame.

10. The method of claim 9, wherein a proxy address is set up for the transmit segment to route the transmit frame as the local fabric frame.

11. The method of claim 7, wherein the transmit frame's cyclic redundancy code is updated.

12. The method of Claim 7, wherein the address mapping cache uses a compare field, a control field and an output field for routing the transmit frame to the local fabric and the remote fabric;
wherein the compare field includes a port address and a fabric identifier field in an inter-fabric frame identifier head ("FR_Header"); the port address includes a destination identifier (D_ID) and a source identifier (S_ID); and if the FR_header is present in the transmit frame, then to route the transmit frame, the S_ID is compared;
wherein the control field includes (i) a FR_Header flag, which if set, is used to compare the FR_Header field in the transmit frame; and if the FR_Header flag is not set, then FR_Header field is ignored; (ii) compare fabric identifier only flag, which when set, is used to compare a fabric identifier; and (iii) a D_ID flag, which when set, is used to compare and substitute the D_ID; and
wherein the output field includes (i) a new port address field that is used for address substitution when using one of the compare fields provides a match; (ii) an add header flag, which when set, is used to add the FR_Header to the transmit frame; (iii) a delete header flag, which when set, is used to remove the FR_header flag; and (iv) a new fabric identifier that is used for a destination fabric associated with a proxy address that matches an address map cache entry.

13. A fibre channel switch element, comprising:
a port having a receive segment and a transmit segment for receiving and transmitting a fibre channel frame;
wherein the port includes a hardware based address mapping cache that is used for routing the fibre channel frame to local fabric or to a remote fabric; the address mapping cache using a compare field, a control field and an output field for routing the fibre channel frame to the local fabric and the remote fabric;
wherein the compare field includes port address and a fabric identifier field in an inter-fabric frame identifier header ("FR_Header"); the port address includes a destination identifier (D_ID ) and a source identifier (S_ID); and if the FR_Header is present in the fibre channel frame, then to route fibre channel frame, the D_ID is compared, if the fibre channel frame is in the receive segment, and the S_ID is compared, if the fibre channel frame is in the transmit segment;
wherein the output field includes (i) a FR_Head flag, which if set, is used to compare the FR_Header field in the fibre channel frame; and if the FR_Header flag is not set, then FR_Header field is ignored; (ii) a compare fabric identifier only flag, which when set, is used to compare a fabric identifier; and (iii) a D_ID flag, which when set, is used to compare and substitute the D_ID; and
wherein the output field includes (i) a new port address field that is used for address substitution when using one of the compare fields provides a match; (ii) an add header flag, which when set, is used to add the FR_Header to the fibre channel frame; (iii) a delete header flag, which when set, is used to remove the FR_header flag; and (iv) a new fabric identifier that is used for destination fabric associated with a proxy address that matches an address map cache entry.

14. The fibre channel switch element of claim 13 wherein the D_ID or the S_ID address field in the fibre channel frame is substituted if there is a match from the address mapping cache.

15. The fibre channel switch element of claim 13, wherein if there is said match from the address mapping cache and the fibre channel frame includes the FR_Header, then the FR_Header is deleted if the delete header flag is set.

16. The fibre channel switch element of claim 13, wherein the new Fabric identifier used for the destination fabric associated with the proxy address, is a part of the FR_Header.

17. The fibre channel switch element of claim 13, wherein the
address mapping cache is also used for routing frames from one virtual fabric to another by comparing a virtual fabric identifier ("VF_ID") field to a Virtual fabric identifier in a virtual fabric tagging header (VFT_Header).

18. The fibre channel switch element of claim 17, wherein if the fibre channel frame includes the VFT_Header and the VF_ID and the D_ID and the S_ID match address mapping cache entries, then the VF_ID, D_ID and S_ID values are replaced.

* * * * *

UNITED STATES PATENT AND TRADEMARK OFFICE
CERTIFICATE OF CORRECTION

PATENT NO. : 7,519,058 B2  
APPLICATION NO. : 11/037922  
DATED : April 14, 2009  
INVENTOR(S) : Frank R. Dropps Page 1 of 2

It is certified that error appears in the above-identified patent and that said Letters Patent is hereby corrected as shown below:

On Title page 4, in column 2, under "Other Publications", line 14, delete "Stroage" and insert -- Storage --, therefor.

On Title page 4, in column 2, under "Other Publications", line 16, delete "Fabirc" and insert -- Fabric --, therefor.

On Title page 4, in column 2, under "Other Publications", line 19, delete "Wavelegth" and insert -- Wavelength --, therefor.

On Title page 4, in column 2, under "Other Publications", line 21, delete "Pittsburg" and insert -- Pittsburgh --, therefor.

On Title page 4, in column 2, under "Other Publications", line 23, delete "Presentatio" and insert -- Presentation --, therefor.

On Title page 5, in column 2, under "Other Publications", line 33, delete "Offic eACtion" and insert -- Office Action --, therefor.

On Title page 5, in column 2, under "Other Publications", line 69, delete "USPTo" and insert -- USPTO --, therefor.

In column 5, line 25, delete "FibreChannel" and insert -- Fibre Channel --, therefor.

In column 11, line 34, claim 6, delete "he" and insert -- the --, therefor.

In column 12, line 17, claim 12, delete "head" and insert -- header --, therefor.

In column 12, line 24, in claim 12, delete "compare" and insert -- a compare --, therefor.

In column 12, line 42, in claim 13, delete "local" and insert -- a local --, therefor.

Signed and Sealed this

Ninth Day of November, 2010

David J. Kappos  
*Director of the United States Patent and Trademark Office*

In column 12, line 55, in claim 13, delete "output" and insert -- control --, therefor.

In column 12, line 55, in claim 13, delete "Head" and insert -- Header --, therefor.